United States Patent [19] [11] 4,095,342
Oertli [45] Jun. 20, 1978

[54] RADIO NAVIGATION AID

[76] Inventor: Donald E. Oertli, Rte. 2, Box 2146, Hamilton, Mont. 59840

[21] Appl. No.: 757,976

[22] Filed: Jan. 10, 1977

[51] Int. Cl.² .................. G01C 21/20; G06G 1/00
[52] U.S. Cl. ................... 33/1 SD; 33/76 V; 33/98; 235/61 NV
[58] Field of Search .............. 33/1 SB, 1 SD, 76 V, 33/98, 278, 279, 280; 235/61 NV

[56] References Cited

U.S. PATENT DOCUMENTS

| 364,630 | 6/1887 | Bowyer | 33/279 |
| 1,661,096 | 2/1928 | Rowe | 33/98 |
| 1,942,536 | 1/1934 | Clementi | 33/76 VA |
| 2,448,410 | 8/1948 | Baumgartner | 235/61 NV |
| 2,641,843 | 6/1953 | Hart et al. | 33/98 |
| 3,116,558 | 1/1964 | Dimo | 33/98 |
| 3,187,434 | 6/1965 | Casagrande | 33/1 SD |
| 3,281,942 | 11/1966 | Preuit | 33/98 |
| 3,863,347 | 2/1975 | Banner | 33/1 SB |

FOREIGN PATENT DOCUMENTS

| 899,178 | 7/1944 | France | 33/98 |
| 334,476 | 3/1921 | Germany | 33/98 |

Primary Examiner—Richard E. Aegerter
Assistant Examiner—Richard R. Stearns
Attorney, Agent, or Firm—Wells, St. John & Roberts

[57] ABSTRACT

A navigation aid for visually indicating to an aircraft pilot or other user the distance and bearing to a destination by use of radio navigation information from two pre-located sources. The axis of a compass rose representative of the destination is preset spacially and angularly with respect to the two radio stations, each represented by an individual compass rose longitudinally movable along primary elongate arms connecting the three compass roses. Three secondary elongate arms are pivotally movable about the respective compass rose axes. By setting two of the secondary elongate arms to represent the bearing of the aircraft to each of the radio stations, distance to the destination can be read directly from the intersection of the three secondary elongate arms. The desired bearing is indicated by the angular relationship between the compass rose centered about the axis representative of the destination and the secondary elongate arm pivoted about its axis.

3 Claims, 4 Drawing Figures

RADIO NAVIGATION AID

BACKGROUND OF THE INVENTION

This invention relates to navigation aids and plotters or computers for small aircraft users, small boats, and similar vehicles where navigation by directional radio signals is desired without the availability of sufficient space for large detailed charts and the instruments necessary for their proper interpretation. The device disclosed herein eliminates the need for an air or sea chart to ascertain the magnetic heading and distance remaining at various intervals or points along a course from the starting point to a destination.

While this navigation aid can be used in conjunction with any type of cartographic charts, it is particularly useful in conjunction with the "Sectional Aeronautical Charts" published and printed by the U. S. Coast and Geodetic Survey Office of the Department of Commerce, which are almost universally used by private pilots in the U.S. On these charts, all airports are indicated by a legend and those having "Very High Frequency Omni-Directional Radio Range" (VOR) are indicated with an imprinted compass rose. The compass rose surrounds the airport on the chart and is aligned with magnetic North.

The angular and distance relationship between any two points on a chart can be readily determined by the use of mechanical plotting devices which typically comprise a circular compass rose and a longitudinal distance scale pivotally mounted about the center of the compass rose. Examples of such devices are illustrated in the prior patents to Sabadishin, U.S. Pat. No. 3,387,372, Haws, U.S. Pat. No. 3,881,253 and Price, U.S. Pat. No. 3,855,706.

Any intermediate navigational position can be plotted by determining the intersection of the signals received from two VOR stations. While various devices have been designed to assist in determining this intersection in an aircraft, they typically require pins be inserted through a chart, and require placement and manipulation of devices having two elongated arms and a pair of compass roses. An example is the apparatus shown in the Sabadishin U.S. Pat. No. 3,387,372 and the patent to Cherry, U.S. Pat. No. 3,824,693. More complicated instruments having two or more pivoted arms are illustrated in the following representative prior U.S. Pat. Nos. McCluskey, 2,159,562; Baumgartner, 2,448,410; Hart, 2,641,843; Greene, 2,736,096; Casagrande, 3,187,434; Preuit, 3,281,942; and Novakovic 3,621,578. While these devices mathematically locate navigational positions from charts, they all require the instrument to be used directly upon a reference chart. Most are more concerned with locating the position of the user with reference to radio signal locators, and require substantial manipulation to determine a heading to a destination other than a position having a VOR station.

In contrast, the present device, while preset by reference to a chart, requires no chart during normal use while flying an aircraft or operating a boat. It serves to directly compute the heading required to reach any intermediate destination and simultaneously provides a visual indication of the distance from the present position of the user to the desired destination. Because it does not have to be used while resting on a chart, it can be constructed to a relatively small scale so as to be mounted in a cockpit without interferring with other instruments or with the vision of the user. Its manipulation and setting is relatively easy, and it readily provides the user with information otherwise available only through much more expensive sophisticated radio navigational equipment commonly found in commercial aircraft.

SUMMARY OF THE INVENTION

The radio navigation aid described herein comprises a first compass rose that is rotatable about a first axis and first and second primary elongate arms which are independnetly pivoted about the axis of the first compass rose. Each primary elongate arm has a longitudinal axis radiating outward, indicative of distance from the first axis. A second compass rose is rotatable about a second axis located along the longitudinal axis of the first primary elongate arm. A third compass rose is rotatable about a third axis located along the longitudinal axis of the second primary elongate arm. Means is provided for permitting relative longitudinal movement between the first compass rose and the second compass rose along the longitudinal axis of the first primary elongate arm. Means is also provided for permitting relative longitudinal movement between the first compass rose and the third compass rose along the longitudinal axis of the second primary elongate arm. Three secondary elongate arms are respectively mounted for pivotal movement about the three axes of the first compass rose, the second compass rose, and the third compass rose.

The three compass roses and the two primary elongate arms are preset by reference to a navigational chart to fix them in positions representative of the distances and angular bearings between two radio navigational locations and the intended destination. One compass rose serves to represent the destination, the other two represent the two radio signal locations. The intersection of the three secondary elongate arms serves as a visual indication of the present location of the user. If the two secondary elongate arms radiating outwardly from the axis which represent the locations of the radio signals are positioned angularly to represent the heading from the user to the respective radio signals, the third secondary elongate arms can be used to provide a direct reading of the destination heading and distance.

A first object of this invention is to provide a relatively simple instrument for direct reading of a destination heading and distance by a user flying along a path not directly in line between navigational radio stations.

Another object of the invention is to provide such an instrument which can be readily used in a restricted space, such as the cockpit of an aircraft, without requiring simultaneous use of charts or other reference materials.

Another object of the invention is to provide a device which can be preset while on the ground, and which will remain in its set condition while multiple readings are made from it during travel.

These and further objects will be evident from the following disclosure and the accompanying drawings, which illustrate a preferred form of the invention.

DESCRIPTION OF THE PREFERRED EMBODIMENT

The drawings illustrate a navigation aid designed to provide direct reading of the basic course and distance from any flight position to a destination. It has become common practice for private aircraft to be flown between VOR stations, flying a somewhat zigzag course from one station to the next, ultimately leading to the VOR station closest to the intended destination. The pilot then takes a bearing from the final station to the destination. By reference to available charts, the distance and time to the destination can then be computed. However, such computations are always subject to pilot error, particularly when attempted while flying an aircraft.

Figure 1:
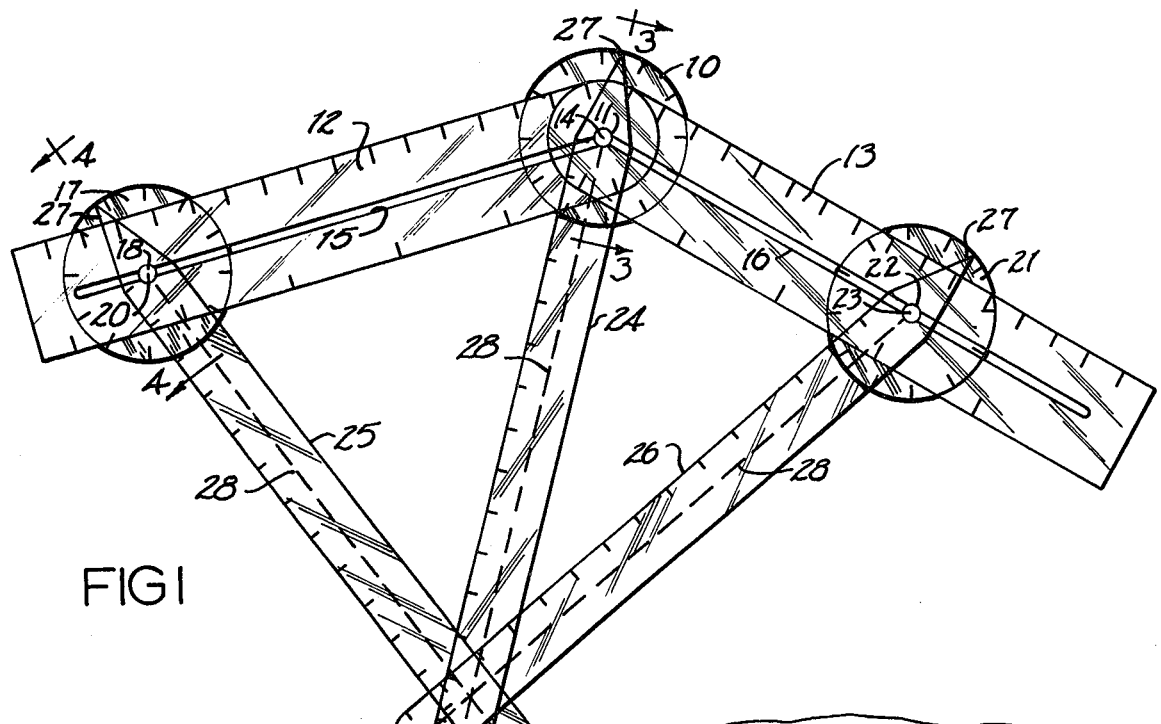
FIG. 1 is a plan view of the navigation aid.

The navigation aid illustrated in FIG. 1 can be constructed to a size permitting it to be directly scaled to available navigation charts. When so constructed, and when fabricated from transparent materials, the navigation aid can be preset directly on a chart and then subsequently manipulated independent of the chart. However, the device can be constructed to a much smaller scale to facilitate its use in a restricted space, and can be made so small as to permit it to be hung about the neck of the user. It is preferably clipped or mounted to a holder on a control wheel or an accessible portion of the aircraft or vessel cockpit so that it can be read directly while the user is looking straight ahead during flight or voyage.

The navigation aid comprises a first compass rose 10 having a first central axis 11. The compass rose 10 is preferably formed as a circular disk having planar surfaces on which are imprinted radial indications of compass headings from 0° to 360°.

A pair of primary elongate arms 12, 13 are pivoted about the first axis 11 by means of a pivot assembly 14. Narrow central slots 15, 16 bisect the primary elongate arms 12, 13 respectively. The slots 15, 16 define longitudinal axes along the arms 12, 13 both radiating outward from the first axis 11.

A second compass rose 17 is rotatable about a second axis at 18, which is located along the longitudinal axis defined by the slot 15 on the first primary elongate arm 12. The second axis 18 is spaced outward from the first axis 11 and is parallel to it. The second compass rose 17 is mounted to the first primary elongate arm 12 by means of a pivot assembly 20.

A third compass rose 21 is rotatable about a third axis 22. The axis 22 is located along the longitudinal axis defined by the slot 16 formed along the center of the second primary elongate arm 13. The axis 22 is parallel to and spaced from the first axis 11. The third compass rose 21 is movably mounted to the second primary elongate arm 13 by a pivot assembly 23.

The first compass rose 10, second compass rose 17 and third compass rose 21 are structurally identical. They are designed to read magnetic compass settings as used in direct radio navigation. The two primary elongate arms 12, 13 are also essentially identical and are scaled linearly to read directly in miles. Transverse lines provide a visual indication of the linear scale involved.

The pivot assembly 14 releasably secures the first compass rose 10 and the two primary elongate arms 12, 13 for selectively permitting each of these elements to be independently pivoted about the first axis 11 or alternately to be locked or fixed with respect to one another in a given angular relationship. Likewise, the pivot assembly 20 can be loosened to permit both longitudinal and pivotal movement of the second compass rose 17 with respect to the first primary elongate arm 12, or alternately fix the two elements with respect to one another. The pivot assembly 23 is identical to pivot assembly 20 and serves a similar function with respect to the mounting of the compass rose 21 on elongate arm 13.

To complete the apparatus, there is provided a first secondary elongate arm 24 that is free to pivot about the first axis 11. A similar second secondary elongate arm 25 is pivoted about the second axis 18, and a third secondary elongate arm 26 is pivoted about the third axis 22. The arms 24, 25 and 26 are pivotally mounted on the pivot assemblies 14, 20 and 23, respectively. They are not locked by manipulation of the respective pivot assemblies, but are always free to move with suitable frictional resistance.

Each secondary elongate arm is identical and includes an outer pointer 27 overlapping the compass rose with which it is used and an elongated visual line 28 radiating from the axis about which it is pivoted. Transverse linear scales are providing along the line 28 for visual reading of linear distance from the pivotal axis of each secondary elongate arm.

Figure 2:
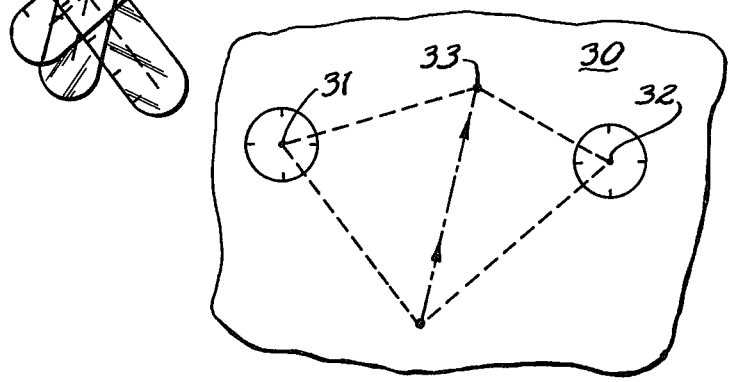
FIG. 2 is a fragmentary view of a reference chart.
Figure 3:
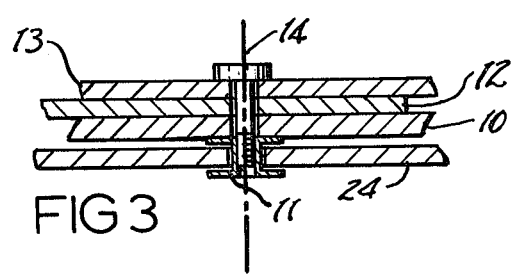
FIG. 3 is a sectional view taken along line 3—3 in FIG. 1.
Figure 4:
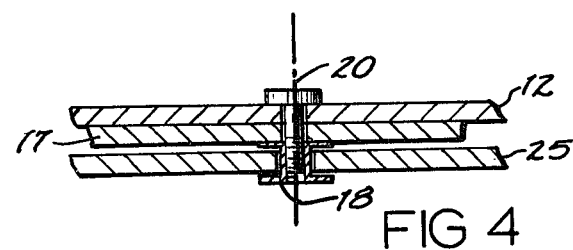
FIG. 4 is a sectional view taken along line 4—4 in FIG. 1.

To utilize the navigation aid, one compass rose 10, 17 or 21 is selected as being indicative of the destination. The others are selected to represent nearby VOR stations from which radio signals will be available during travel. In the example illustrated in FIGS. 1 and 2, the axis of compass rose 10 represents the intended destination, while axes of the two remaining compass roses 17, 21 represent nearby VOR stations.

If the device is constructed to a scale corresponding to the chart being used, it can be used as a regular navigation plotter prior to travel.

While on the ground during the preflight phase of a trip, the relative information required to preset the three compass roses and the two primary elongate arms can be obtained from published charts.

To set the device, the user must determine from a chart 30 (FIG. 2) the distances and magnetic headings from the two ground stations 31, 32 to the destination point 33. When using radio stations to the left and right of the proposed course, the user sets the respective distances from the VOR stations to the destination point on the respective first and second primary elongate arms 12, 13 by moving the second compass rose 17 along slot 15 and the third compass rose 21 along slot 16. Each compass rose 17, 21 must then be oriented with the VOR display available on chart 30 and the measured heading set must be set from each VOR station 31, 32 to the destination 33 along the respective slots 15, 16. The first compass rose 10 is then oriented with either compass rose 17 or 21 to correct for the deviation between true North and magnetic North. After these original settings are made, the pivot assemblies 14, 20 and 23 are locked to prevent any further relative movement between the first compass rose 10, the second compass rose 17, the third compass rose 21, and the first and second primary elongate arms 12, 13.

During flight, signals are received from the two VOR stations and the user can set the radio compass bearings from this present position on the second compass rose 17 by pivoting the secondary elongate arm 25 and on the third compass rose 21 by pivoting the secondary elongate arm 26. The intersection of the two arms 25, 26 will be indicative of the present position of the user. By then causing the third secondary elongate arm 24 to meet at this common point intersection, one provides a visual portrayal of the desired line of travel to the destination point along the visual line 28 provided on arm 24. The required magnetic heading can be read directly on the compass rose 10 as indicated by arrow 27 and the linear distance remaining to the destination can be read directly on arm 24 at the intersection of the three lines 28.

For longer flights, several such devices can be preset for various stages of travel and used in succession. Alternately, the use can periodically reset the device while traveling between known radio stations, and take successive readings from the device while traveling between the stations.

The navigation aid described above can be used to simply and accurately perform the same calculations as much more elaborate electronic area navigation systems. Furthermore, all radio ground station signals can be utilized with receiving equipment that provides compass bearings from such signals, whereas electronic area navigation systems can utilize only limited types of available stations.

The destination can be the axis of any one of the three compass rose assemblies illustrated, although the greatest angular distinctions in readings will be obtained by using stations at opposite sides of the desired course as illustrated.

Further modification can be made in the structure without deviating from this disclosure.

Having described my invention, I claim:

1. In a radio navigation aid:

first and secondary primary elongate arms movably connected to one another about a first axis for independent pivotal motion of the respective arms, each primary elongate arm having a longitudinal axis radiating outward from said first axis;

a first compass rose rotatably mounted to said first and second primary elongate arms about said first axis;

a second compass rose rotatably mounted to said first primary elongate arm about a second axis that is parallel to and spaced from said first axis and which is located along the longitudinal axis of said first primary elongate arm;

a third compass rose rotatably mounted to said second primary elongate arm about a third axis that is parallel to and spaced from said first axis and which is located along the longitudinal axis of the second primary elongate arm;

means for permitting relative longitudinal movement between the first compass rose and the second compass rose along the longitudinal axis of the first primary elongate arm;

means for permitting relative longitudinal movement between the first compass rose and the third compass rose along the longitudinal axis of the second primary elongate arm;

a first secondary elongate arm pivotally mounted about said first axis for motion independent of said first compass rose and said primary elongate arms;

a second secondary elongate arm pivotally mounted about said second axis for motion independent of said second compass rose and said first primary elongate arm;

and a third secondary elongate arm pivotally mounted about said third axis for motion independent of said third compass rose and said second primary elongate arm;

each secondary arm having a pointer thereon overlapping the compass rose centered on the axis about which it is mounted and capable of visually indicating a heading on the compass rose;

said secondary elongate arms each extending to a common side of the first and second primary elongate arms, and said first compass rose being intermediate the second and third compass roses;

and means for selectively fixing the positions of said first, second and third compass roses and said first and second primary elongate arms relative to one another while permitting pivotal movement of the secondary elongate arms about the respective axes about which they are mounted.

2. A radio navigation aid as set out in claim 1 wherein each secondary elongate arm has a visual longitudinal axis radiating from the axis about which it is mounted.

3. A radio navigation aid as set out in claim 1 wherein each secondary elongate arm has a visual longitudinal axis radiating from the axis about which it is mounted and has indicia thereon representative of distance along its longitudinal axis from the axis about which it is mounted.

* * * * *